US012639595B2

(12) United States Patent
Shibata et al.

(10) Patent No.: US 12,639,595 B2
(45) Date of Patent: May 26, 2026

(54) INFORMATION PROCESSING DEVICE, INFORMATION COMPUTING METHOD, AND NON-TRANSITORY COMPUTER READABLE STORAGE MEDIUM

(71) Applicant: Yahoo Japan Corporation, Tokyo (JP)

(72) Inventors: Tomohide Shibata, Tokyo (JP); Hayato Kobayashi, Tokyo (JP); Hiroaki Taguchi, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 993 days.

(21) Appl. No.: 17/196,689

(22) Filed: Mar. 9, 2021

(65) Prior Publication Data

US 2021/0357786 A1      Nov. 18, 2021

(30) Foreign Application Priority Data

Mar. 19, 2020    (JP) ................................. 2020-049566

(51) Int. Cl.
*G06N 5/04*          (2023.01)
*G06N 20/00*        (2019.01)

(52) U.S. Cl.
CPC .............. *G06N 5/04* (2013.01); *G06N 20/00* (2019.01)

(58) Field of Classification Search
CPC ............ G06N 20/00; G06N 3/08; G06N 5/04; G06N 7/01; G06N 20/20; G06N 5/025; G06N 3/02; G06N 3/042; G06N 3/092; G06N 3/09; G06N 3/088
See application file for complete search history.

(56) References Cited

U.S. PATENT DOCUMENTS

| | | | | |
|---|---|---|---|---|
| 2014/0337257 A1* | 11/2014 | Chatterjee | .............. | G06N 20/00 706/12 |
| 2015/0006512 A1* | 1/2015 | Alfonseca | ............. | G06F 40/258 707/722 |
| 2016/0041985 A1* | 2/2016 | Manterach | .............. | G06F 16/93 707/727 |

FOREIGN PATENT DOCUMENTS

JP          2019-53558 A      4/2019

OTHER PUBLICATIONS

Böhm, F., Gao, Y., Meyer, C. M., Shapira, O., Dagan, I., & Gurevych, I. (Sep. 2019). Better rewards yield better summaries: Learning to summarise without references. arXiv preprint arXiv:1909. 01214. (Year: 2019).*

(Continued)

*Primary Examiner* — Michael J Huntley
*Assistant Examiner* — Maggie Thanh Maido
(74) *Attorney, Agent, or Firm* — Procopio, Cory, Hargreaves & Savitch LLP

(57)                ABSTRACT

An information processing apparatus according to the present application includes the generation unit, the evaluation unit and the reinforcement learning unit. The generation unit generates suggestion information from predetermined content using the generation model which generates from content, suggestion information indicating content of the content. The evaluation unit evaluates the suggestion information generated by the generation unit using the evaluation model which has learned which of a plurality of pieces of suggestion information indicating content of the same target content is favorable. The reinforcement learning unit performs reinforcement learning of the generation model on the basis of the evaluation result by the evaluation unit.

7 Claims, 4 Drawing Sheets

(56)         References Cited

OTHER PUBLICATIONS

Daniel, F., Kucherbaev, P., Cappiello, C., Benatallah, B., & Allahbakhsh, M. (Jan. 2018). Quality control in crowdsourcing: A survey of quality attributes, assessment techniques, and assurance actions. ACM Computing Surveys (CSUR), 51(1), 1-40. (Year: 2018).*

Derhami, V., Paksima, J., & Khajah, H. (Jun. 2015). Web pages ranking algorithm based on reinforcement learning and user feedback. Journal of Al and Data Mining, 3(2), 157-168. (Year: 2015).*

Serban, I. V., Sankar, C., Germain, M., Zhang, S., Lin, Z., Subramanian, S., . . . & Bengio, Y. (Nov. 2017). A deep reinforcement learning chatbot. arXiv preprint arXiv:1709.02349. (Year: 2017).*

Gao, Y., Meyer, C. M., Mesgar, M., & Gurevych, I. (Jul. 2019). Reward learning for efficient reinforcement learning in extractive document summarisation. arXiv preprint arXiv:1907.12894. (Year: 2019).*

Bahdanau, D. et al. "Neural Machine Translation by Jointly Learning to Align and Translate" Proceedings of the International Conference on Learning Representations 2015, retrieved online Mar. 18, 2020, https://arxiv.org/abs/1409.0473 (15 pages).

Luong, T. et al. "Effective Approaches to Attention-based Neural Machine Translation" Proceedings of the 2015 Conference on Empirical Methods in Natural Language Processing, Sep. 2015, pp. 1412-1421, Lisbon, Portugal; retrieved online Mar. 18, 2020, https://www.aclweb.org/anthology/D15-1166/ (10 pages).

Japanese Patent Office, Notice of Reasons for Refusal, Application No. JP2020-049566, dated Jun. 23, 2022, in 5 pages.

Higurashi et al., Headline Generation of Yahoo !! Chiebukuro Based on Learning to Rank, dated Jun. 8, 2018, in 11 pages.

* cited by examiner

FIG.1

INFORMATION PROCESSING APPARATUS ⌐100

COMMUNICATION UNIT ⌐110

CONTROL UNIT ⌐130

ACQUISITION UNIT ⌐131

LEARNING UNIT ⌐132

GENERATION UNIT ⌐133

EVALUATION LEARNING UNIT ⌐134

EVALUATION UNIT ⌐135

REINFORCEMENT LEARNING UNIT ⌐136

OUTPUT UNIT ⌐137

STORAGE UNIT ⌐120

HEADLINE INFORMATION STORAGE UNIT ⌐121

⌐121

| HEADLINE ID | HEADLINE | CONTENT URL | ... |
|---|---|---|---|
| T1 | HEADLINE #1 | URL #1 | ... |
| T2 | HEADLINE #2 | URL #2 | ... |
| T3 | HEADLINE #3 | URL #3 | ... |
| ... | ... | ... | ... |

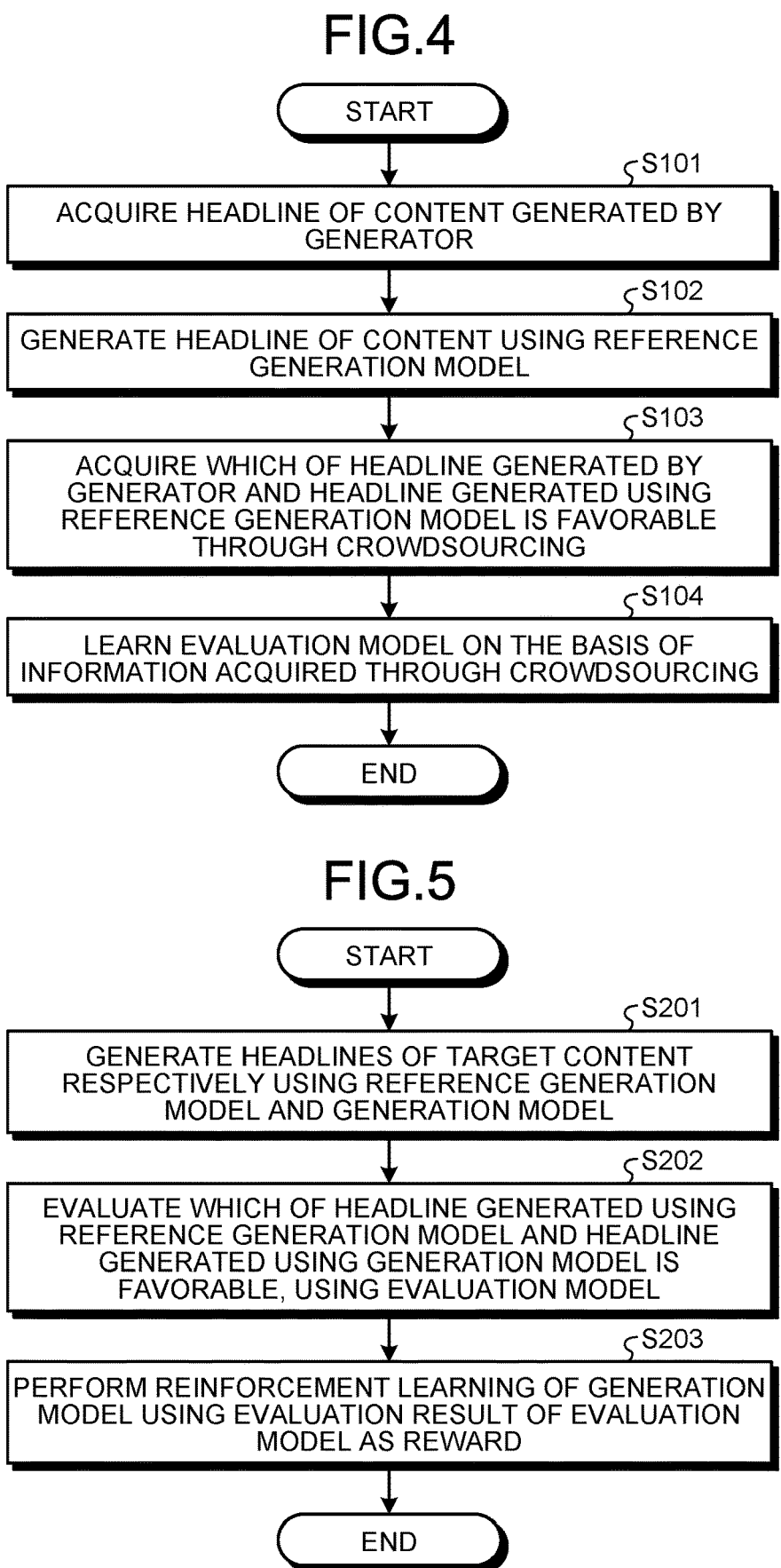

FIG.4

START

S101

ACQUIRE HEADLINE OF CONTENT GENERATED BY GENERATOR

S102

GENERATE HEADLINE OF CONTENT USING REFERENCE GENERATION MODEL

S103

ACQUIRE WHICH OF HEADLINE GENERATED BY GENERATOR AND HEADLINE GENERATED USING REFERENCE GENERATION MODEL IS FAVORABLE THROUGH CROWDSOURCING

S104

LEARN EVALUATION MODEL ON THE BASIS OF INFORMATION ACQUIRED THROUGH CROWDSOURCING

END

FIG.5

START

S201

GENERATE HEADLINES OF TARGET CONTENT RESPECTIVELY USING REFERENCE GENERATION MODEL AND GENERATION MODEL

S202

EVALUATE WHICH OF HEADLINE GENERATED USING REFERENCE GENERATION MODEL AND HEADLINE GENERATED USING GENERATION MODEL IS FAVORABLE, USING EVALUATION MODEL

S203

PERFORM REINFORCEMENT LEARNING OF GENERATION MODEL USING EVALUATION RESULT OF EVALUATION MODEL AS REWARD

END

INFORMATION PROCESSING DEVICE, INFORMATION COMPUTING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2020-049566 filed in Japan on Mar. 19, 2020.

BACKGROUND OF THE INVENTION

1. Field of the Invention

The present invention relates to an information processing apparatus, an information processing method, and an information processing program.

2. Description of the Related Art

In recent years, a number of technologies regarding deep learning have been proposed in a field of natural language processing. For example, a technology of generating a summary of a text from the text using a machine learning model such as sequence-to-sequence (Seq2Seq) has been proposed.

[Non-Patent Document 1] "Neural Machine Translation by Jointly Learning to Align and Translate", Dzmitry Bandanau, Kyunghyun Cho, Yoshua Bengio, Proceedings of the International Conference on Learning Representations 2015, [online], [Searched on Mar. 18, 2020], Internet <URL: https://arxiv.org/abs/1409.0473>

[Non-Patent Document 2] "Effective Approaches to Attention-based Neural Machine Translation", Thang Luong, Hieu Pham, Christopher D. Manning, Proceedings of the Conference on Empirical Methods in Natural Language Processing, [online], [Searched on Mar. 18, 2020], Internet <URL: https://www.aclweb.org/anthology/D15-1166/>

However, there is a case where it cannot be said that an appropriate model is learned with the above-described related art. For example, while a machine learning model such as Seq2Seq is learned so that a correct output can be obtained in units of a word with the above-described related art, such a machine learning model such as Seq2Seq does not perform learning while evaluating good points as a whole sentence. Thus, there is, for example, a case where it cannot be said that a summary which can attract interest of a user is generated.

Therefore, the present disclosure proposes an information processing apparatus, an information processing method, and an information processing program which enable learning of an appropriate model.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an explanatory diagram illustrating outline of an information processing method according to an embodiment;

FIG. 4 is a flowchart illustrating an information processing procedure according to the embodiment;

FIG. 5 is a flowchart illustrating an information processing procedure according to the embodiment.

DETAILED DESCRIPTION OF THE PREFERRED EMBODIMENTS

Figures 2, 3:
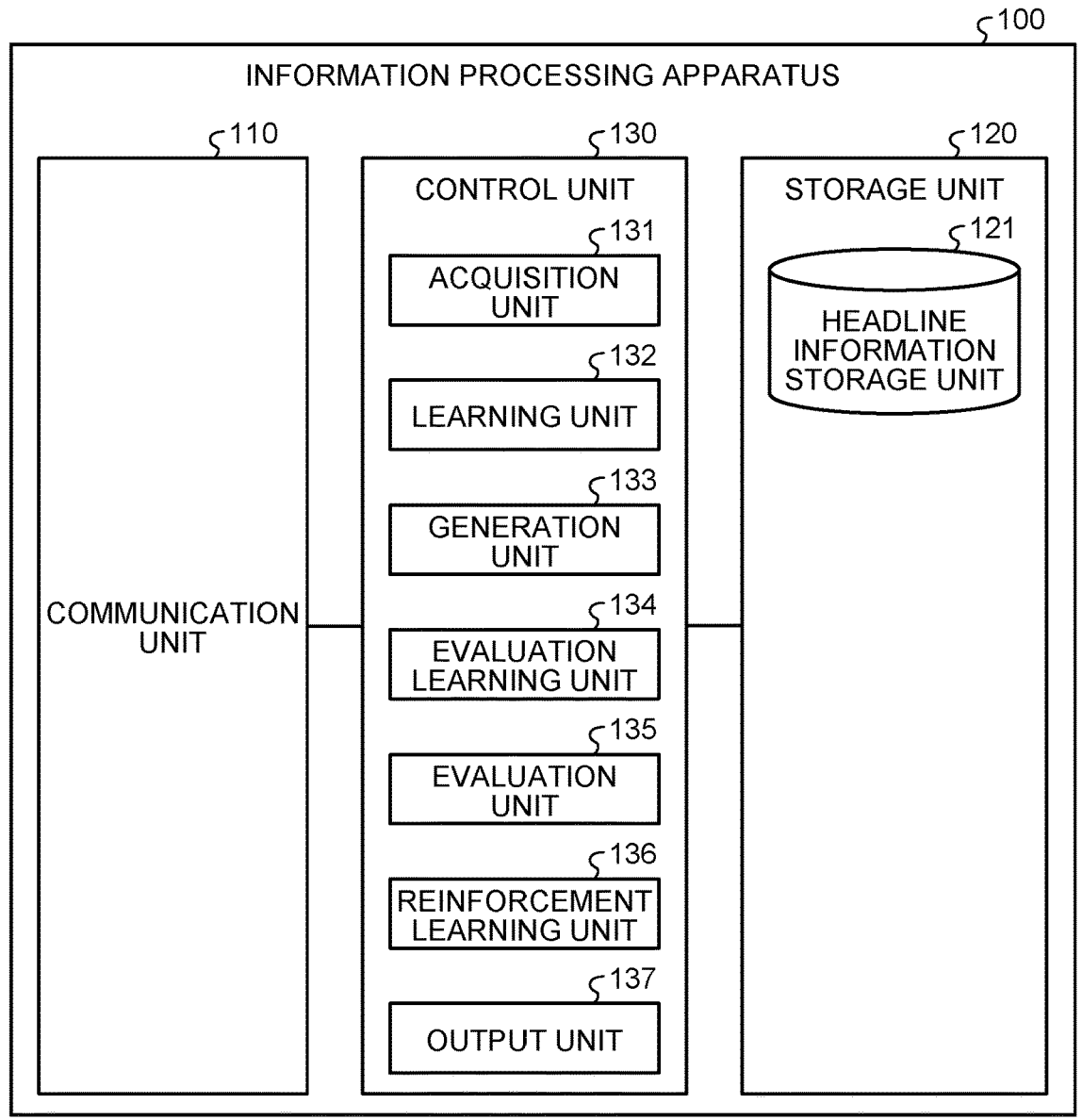
FIG. 2 is a view illustrating a configuration example of an information processing apparatus according to the embodiment.
FIG. 3 is a view illustrating an example of a headline information storage unit according to the embodiment.

A mode (hereinafter, referred to as an "embodiment") for implementing an information processing apparatus, an information processing method, and an information processing program according to the present application will be described in detail below with reference to the drawings. Note that the embodiment does not limit the information processing apparatus, the information processing method, and the information processing program according to the present application. Further, the same reference numerals will be assigned to the same portions in the following each embodiment, and overlapped description will be omitted.

1. Outline of Information Processing Method

Figure 1:
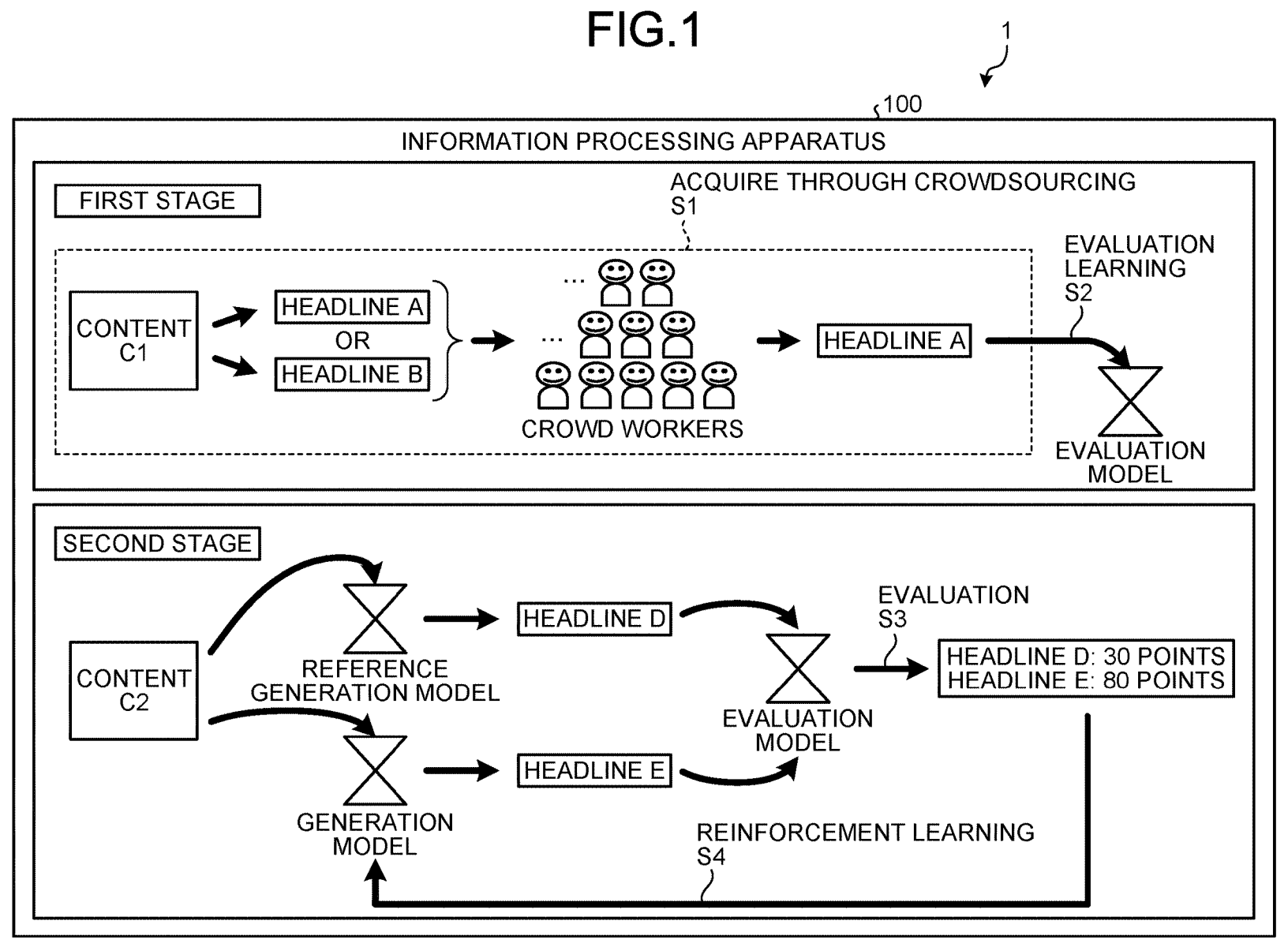

Outline of an information processing method to be performed by an information processing apparatus according to an embodiment will be described first with reference to FIG. 1. FIG. 1 is an explanatory diagram illustrating the outline of the information processing method according to the embodiment. In the example illustrated in FIG. 1, an information processing apparatus 100 learns an evaluation model which evaluates which of a plurality of headlines indicating content of the same target content (such as, for example, a news article) is favorable using crowdsourcing (first stage). Subsequently, the information processing apparatus 100 evaluates a headline of content generated using a generation model which generates from content, a headline indicating content of the content using the evaluation model learned in the first stage. Then, the information processing apparatus 100 performs reinforcement learning of the generation model using an evaluation result output from the evaluation model as a reward (second stage).

Here, in recent years, accuracy of a text generation model which generates a text becomes higher, and thus, it is not easy to further improve accuracy of the text generation model. For example, in recent years, headline generation models which generate headlines from content include a model which is capable of generating a headline which is indistinguishable from a headline generated by a human.

Examples of such a text generation model include Seq2Seq. Seq2Seq performs learning so that a correct output can be obtained in units of a word, but does not perform learning while explicitly evaluating good points as a whole text. Thus, there is, for example, a case where it cannot be said that a summary which can attract interest of a user is generated.

Therefore, the information processing apparatus 100 according to the present application generates a headline from predetermined content using a generation model which generates from content, a headline indicating content of the content. Further, the information processing apparatus 100 evaluates a headline generated using the generation model, using an evaluation model which has learned which of a plurality of headlines indicating content of the same target content is favorable. Further, the information processing apparatus 100 performs reinforcement learning of the generation model on the basis of an evaluation result output from the evaluation model.

Thus, the information processing apparatus 100 is able to learn the evaluation model that evaluates good points as a whole sentence in advance, acquire the result through reinforcement learning, and improve quality of the generation model which generates a headline. Therefore, the information processing apparatus 100 is able to learn an appropriate model.

Returning to explanation of FIG. 1, in the first stage illustrated in FIG. 1, first, the information processing apparatus 100 acquires headlines which summarize content of the same content and which are generated using two different types of methods. For example, the information processing apparatus 100 acquires a headline A of content C1 generated by an editor (hereinafter, also referred to as a generator) who generates a headline of content. Note that in the following description, a headline generated by the generator, that is, by a human will be sometimes described as a human-generated headline. Further, the information processing apparatus 100 acquires a headline B of the content C1 generated using a reference generation model which is generated using a publicly known technology such as Seq2Seq and which generates a headline of the content from the content. Here, the reference generation model is a model which becomes a reference for evaluation of the generation model to be subjected to reinforcement learning which will be described later. Note that in the following description, a headline generated using the reference generation model will be sometimes described as a reference headline.

Subsequently, the information processing apparatus 100 acquires an evaluation result indicating which of the headline A generated by the generator and the headline B generated using the reference generation model is favorable using crowdsourcing (step S1). For example, the information processing apparatus 100 presents a pair of the headline A and the headline B to ten crowd workers. Subsequently, the information processing apparatus 100 acquires evaluation results indicating which of the headline A and the headline B is favorable (for example, which of the headline A and the headline B the crowd workers are tempted to click) from the respective crowd workers. The information processing apparatus 100 then calculates the number of votes obtained for the headline A (for example, eight) and the number of votes obtained for the headline B (for example, two) on the basis of the evaluation results acquired from the respective crowd workers. Further, the information processing apparatus 100 compares the calculated number of votes obtained for the headline A with the calculated number of votes obtained for the headline B to acquire an evaluation result indicating that a headline with more votes is favorable.

In a similar manner, the information processing apparatus 100 prepares a number of pairs of human-generated headlines and reference headlines for a number of pieces of the same target content other than the pair of the headline A and the headline B. Subsequently, the information processing apparatus 100 acquires an evaluation result indicating which of the human-generated headline and the reference headline is favorable for each of a number of the pairs of the human-generated headlines and the reference headlines through crowdsourcing.

Subsequently, the information processing apparatus 100 learns an evaluation model which evaluates which of a plurality of headlines indicating content of the same target content is favorable on the basis of respective evaluation results for a number of the pairs acquired through crowdsourcing (step S2). For example, the information processing apparatus 100 learns an evaluation model so as to output information indicating a headline with a favorable evaluation result (for example, a headline with more votes) as output information in a case where a pair of a headline with an unfavorable evaluation result (for example, a headline with less votes) and the headline with the favorable evaluation result (for example, the headline with more votes) is input to the evaluation model as input information. Alternatively, the information processing apparatus 100 may learn an evaluation model so as to output scores based on the numbers of votes obtained for respective headlines as output information in a case where a pair of a headline with an unfavorable evaluation result (for example, a headline with less votes) and a headline with a favorable evaluation result (for example, a headline with more votes) is input to the evaluation model as input information.

Subsequently, in the second stage illustrated in FIG. 1, the information processing apparatus 100 evaluates a headline generated using a generation model which generates from content, a headline indicating content of the content using the evaluation model learned in the first stage (step S3). For example, the information processing apparatus 100 generates a headline D from content C2 using the generation model. Note that in the following description, the headline generated using the generation model will be sometimes described as a generated headline. Further, the information processing apparatus 100 generates a headline E from the content C2 using a reference generation model which becomes a reference for evaluation of the generation model. Subsequently, the information processing apparatus 100 acquires a pair of the headline D generated using the generation model and the headline E generated using the reference generation model and inputs the acquired pair of the headline D and the headline E to the evaluation model as input information. Then, the information processing apparatus 100 outputs an evaluation value indicating favorableness of the headline D and an evaluation value indicating favorableness of the headline E as output information of the evaluation model. In FIG. 1, the evaluation model evaluates the evaluation value of the headline D as "30 points" and evaluates the evaluation value of the headline E as "80 points". The information processing apparatus 100 then outputs "30 points" indicating the evaluation value of the headline D and "80 points" indicating the evaluation value of the headline E as output information of the evaluation model.

Subsequently, the information processing apparatus 100 performs reinforcement learning of the generation model using the evaluation result output from the evaluation model as a reward (step S4). For example, the information processing apparatus 100 performs reinforcement learning of the generation model while setting a positive reward in a case where the evaluation value of the generated headline generated using the generation model is higher (that is, the generated headline is evaluated as more favorable than the reference headline). Meanwhile, the information processing apparatus 100 performs reinforcement learning of the generation model while setting a negative reward in a case where the evaluation value of the reference headline is higher (that is, the reference headline is evaluated as more favorable than the generated headline). In FIG. 1, the evaluation value of the headline E generated using the generation model is higher (that is, the headline E is evaluated as more favorable than the headline D), and thus, the information processing apparatus 100 performs reinforcement learning of the generation model while setting a positive reward.

In a similar manner, the information processing apparatus 100 prepares pairs of reference headlines and generated headlines for a number of pieces of the same target content. Subsequently, the information processing apparatus 100 inputs a number of respective pairs of the reference headlines and the generated headlines to the evaluation model as input information. Then, the information processing apparatus 100 outputs an evaluation result indicating which of the reference headline and the generated headline is favorable for each of a number of the pairs as output information of the evaluation model. Then, the information processing apparatus 100 performs reinforcement learning of the generation model for each of a number of the pairs while setting each evaluation result output from the evaluation model as a reward.

Further, while not illustrated in FIG. 1, the information processing apparatus 100 generates a headline from predetermined content using the generation model subjected to reinforcement learning after performing reinforcement learning of the generation model. Subsequently, the information processing apparatus 100 outputs the generated headline after generating the headline using the generation model subjected to reinforcement learning.

Note that while an example has been described in FIG. 1 where the content is text content such as a news article and suggestion information indicating content of the content is a headline, the content and the suggestion information are not limited to these. Specifically, the content and the suggestion information are not particularly limited if the content and the suggestion information suggest the content and content of the content and context of the content. For example, the content may be music content, and the suggestion information indicating content of the content may be a sample of a song. Further, the content may be image content (a moving image or a still image), and the suggestion information indicating content of the content may be thumbnail.

2. Configuration Example of Information Processing Apparatus

A configuration of the information processing apparatus 100 according to the embodiment will be described next using FIG. 2. FIG. 2 is a view illustrating a configuration example of the information processing apparatus 100 according to the embodiment. As illustrated in FIG. 2, the information processing apparatus 100 includes a communication unit 110, a storage unit 120, and a control unit 130. Note that the information processing apparatus 100 may include an input unit (such as, for example, a keyboard and a mouse) which accepts various kinds of operations from a manager, or the like, of the information processing apparatus 100, and a display unit (such as, for example, a liquid crystal display) for displaying various kinds of information.

Communication Unit 110

The communication unit 110 is implemented with, for example, a network interface card (NIC). Further, the communication unit 110 is connected to a network in a wired or wireless manner and transmits and receives information to and from, for example, terminal apparatuses of crowd workers and generators.

Storage Unit 120

The storage unit 120 is implemented with, for example, a semiconductor memory device such as a random access memory (RAM) and a flash memory, or a storage device such as a hard disk and an optical disk. As illustrated in FIG. 3, the storage unit 120 includes a headline information storage unit 121.

Headline Information Storage Unit 121

The headline information storage unit 121 stores various kinds of information regarding headlines. FIG. 3 illustrates an example of the headline information storage unit according to the embodiment. In the example illustrated in FIG. 3, the headline information storage unit 121 has items such as "headline ID", "headline" and "content URL".

"Headline ID" indicates identification information for identifying a headline. "Headline" indicates a headline of content. "Content URL" indicates URL of content from which a headline is generated.

Control Unit 130

Returning to explanation of FIG. 2, the control unit 130, which is a controller, is implemented by, for example, various kinds of programs (corresponding to an example of an information processing program) stored in a storage apparatus inside the information processing apparatus 100 being executed by a central processing unit (CPU), a micro processing unit (MPU), a graphics processing unit (GPU) to meet the necessity of considerable computation power, or the like, while a RAM is used as a work area. Further, the control unit 130, which is a controller, is implemented with, for example, an integrated circuit such as an application specific integrated circuit (ASIC) and a field programmable gate array (FPGA).

As illustrated in FIG. 2, the control unit 130 includes an acquisition unit 131, a learning unit 132, a generation unit 133, an evaluation learning unit 134, an evaluation unit 135, and a reinforcement learning unit 136, and implements or executes action of information processing which will be described below. Note that an internal configuration of the control unit 130 is not limited to the configuration illustrated in FIG. 2 and may be other configurations if information processing which will be described later is performed.

Acquisition Unit 131

The acquisition unit 131 acquires a headline of content generated by the generator. For example, the acquisition unit 131 acquires the headline generated by the generator from a terminal apparatus (not illustrated) utilized by the generator.

The acquisition unit 131 acquires headline information and stores the acquired headline information in the headline information storage unit 121.

Further, the acquisition unit 131 acquires an evaluation result indicating which of reference suggestion information generated using a reference generation model which becomes a reference for evaluation and human-generated suggestion information generated by the generator is favorable through crowdsourcing. Specifically, the acquisition unit 131 acquires an evaluation result indicating which of a reference headline of content generated using a reference generation model which becomes a reference for evaluation and a human-generated headline of content generated by a generator is favorable through crowdsourcing.

For example, the acquisition unit 131 presents a pair of a reference headline and a human-generated headline to a plurality of crowd workers (for example, ten crowd workers). Subsequently, the acquisition unit 131 acquires evaluation results indicating which of the reference headline and the human-generated headline is favorable (for example, which of the reference headline and the human-generated headline the crowd workers are tempted to click) from the respective crowd workers. The acquisition unit 131 then calculates the number of votes obtained for the reference headline (for example, eight) and the number of votes obtained for the human-generated headline (for example, two) on the basis of the evaluation results acquired from the respective crowd workers. Further, the acquisition unit 131 compares the calculated number of votes obtained for the reference headline with the calculated number of votes obtained for the human-generated headline to acquire an evaluation result indicating that a headline with more votes is favorable.

In a similar manner, the acquisition unit 131 prepares pairs of human-generated headlines and reference headlines for a number of pieces of content. Subsequently, the acquisition unit 131 acquires an evaluation result indicating which of the human-generated headline and the reference headline is favorable for each of a number of the pairs of headlines through crowdsourcing.

Further, the acquisition unit 131 may acquire an evaluation result indicating which of the human-generated headline and the reference headline is favorable for each of a number of the pairs of headlines through crowdsourcing while limiting attributes of the crowd workers. The evaluation learning unit 134 learns an evaluation model on the basis of the evaluation results in which preference in accordance with attributes of users such as a researcher, a female, a male, a middle age and a youth acquired by the acquisition unit 131 is reflected. This enables the reinforcement learning unit 136 to perform reinforcement learning of the generation model in accordance with the attributes of users such as a researcher, a female, a male, a middle age and a youth.

Further, the acquisition unit 131 may achieve generalization by dispersing attributes of users who take part in crowdsourcing. Specifically, the acquisition unit 131 extracts crowd workers with balance from a wide range of attributes so as to prevent a bias in a specific attribute and acquires an evaluation result indicating which is favorable for each of a number of pairs of headlines from the extracted crowd workers. This enables the reinforcement learning unit 136 to perform reinforcement learning of the generation model for general users.

Learning Unit 132

The learning unit 132 generates a generation model which generates from content, suggestion information indicating content of the content. Specifically, in a case where content such as a news article is input to the generation model as input information, the learning unit 132 learns the generation model so as to output a headline of the content as output information using a publicly known technology such as Seq2Seq.

Further, the learning unit 132 generates a reference generation model which becomes a reference for evaluation by the evaluation unit 135. For example, the learning unit 132 learns the reference generation model in a similar manner to the generation model.

Generation Unit 133

The generation unit 133 generates suggestion information from predetermined content using the generation model which generates from content, suggestion information indicating content of the content. Specifically, the generation unit 133 generates suggestion information from predetermined content using the generation model learned by the learning unit 132. Further, the generation unit 133 generates reference suggestion information from predetermined content using the reference generation model learned by the learning unit 132. For example, the generation unit 133 generates suggestion information which is a headline which summarizes content of predetermined content.

Further, the generation unit 133 generates suggestion information which can transit to predetermined content in a case where the user selects the suggestion information. For example, the generation unit 133 generates suggestion information which includes an embedded link which can transit to predetermined content corresponding to the headline in a case where the user selects the headline.

Evaluation Learning Unit 134

The evaluation learning unit 134 learns an evaluation model on the basis of the information acquired by the acquisition unit 131. Specifically, the evaluation learning unit 134 learns the evaluation model so as to evaluate suggestion information which is evaluated as more favorable in the evaluation result acquired by the acquisition unit 131, more highly than suggestion information which is evaluated as less favorable in the evaluation result acquired by the acquisition unit 131.

For example, the evaluation learning unit 134 learns an evaluation model which evaluates which of a plurality of headlines indicating content of the same target content is favorable on the basis of respective evaluation results for each of a number of the pairs of headlines acquired by the acquisition unit 131. For example, the evaluation learning unit 134 learns an evaluation model so as to output information indicating a headline with a favorable evaluation result (for example, a headline with more votes) as output information in a case where a pair of a headline with an unfavorable evaluation result (for example, a headline with less votes) and the headline with the favorable evaluation result (for example, the headline with more votes) is input to the evaluation model as input information.

Alternatively, the evaluation learning unit 134 may learn an evaluation model so as to output scores (for example, scores proportional to the number of votes) indicating favorableness of respective headlines in a case where a pair of a headline with an unfavorable evaluation result (for example, a headline with less votes) and a headline with a favorable evaluation result (for example, a headline with more votes) is input to the evaluation model as input information.

Evaluation Unit 135

The evaluation unit 135 evaluates the suggestion information generated by the generation unit 133 using the evaluation model which has learned which of a plurality of pieces of suggestion information indicating content of the same target content is favorable. Specifically, the evaluation unit 135 evaluates the suggestion information generated by the generation unit 133 using the evaluation model which has learned which of the reference suggestion information generated using a reference generation model which becomes a reference for evaluation and human-generated suggestion information generated by the generator is favorable. More specifically, the evaluation unit 135 evaluates which of the reference suggestion information generated using the reference generation model which becomes a reference for evaluation and the suggestion information generated by the generation unit 133 is favorable.

For example, the evaluation unit 135 evaluates the headline generated using the generation model, using the evaluation model learned by the evaluation learning unit 134. For example, the evaluation unit 135 inputs a pair of the headline generated by the generation unit 133 using the generation model and the reference headline generated using the reference generation model to the evaluation model as input information and outputs evaluation values indicating favorableness of the respective headlines as output information. Alternatively, the evaluation unit 135 may input the pair of the headline generated by the generation unit 133 using the generation model and the reference headline generated using the reference generation model to the evaluation model as input information and may output information indicating a headline which is evaluated as more favorable between the headline generated using the generation model and the reference headline (for example, the headline itself or identification information for identifying the headline) as the output information.

Reinforcement Learning Unit 136

The reinforcement learning unit 136 performs reinforcement learning of the generation model on the basis of the evaluation result by the evaluation unit 135. Specifically, the reinforcement learning unit 136 performs reinforcement learning of the generation model while setting a higher reward for a higher evaluation result provided by the evaluation unit 135 for the suggestion information generated by the generation unit 133. For example, the reinforcement learning unit 136 performs reinforcement learning of the generation model while setting a higher reward in a case where the evaluation unit 135 evaluates the suggestion information generated by the generation unit 133 as more favorable than the reference suggestion information.

For example, the reinforcement learning unit 136 performs reinforcement learning of the generation model using the evaluation result by the evaluation unit 135 as a reward. For example, the reinforcement learning unit 136 performs reinforcement learning of the generation model while setting a positive reward in a case where the evaluation value of the generated headline generated using the generation model is higher (that is, the generated headline is evaluated as more favorable than the reference headline) as a result of evaluation by the evaluation unit 135. For example, the reinforcement learning unit 136 performs reinforcement learning of the generation model while setting a positive reward proportional to a degree of a difference between the evaluation value of the generated headline and the evaluation value of the reference headline. Meanwhile, the reinforcement learning unit 136 performs reinforcement learning of the generation model while setting a negative reward in a case where the evaluation value of the reference headline is higher (that is, the reference headline is evaluated as more favorable than the generated headline) as a result of evaluation by the evaluation unit 135. For example, the reinforcement learning unit 136 performs reinforcement learning of the generation model while setting a negative reward proportional to a degree of a difference between the evaluation value of the reference headline and the evaluation value of the generated headline.

Output Unit 137

The output unit 137 generates suggestion information from predetermined content using the generation model subjected to reinforcement learning by the reinforcement learning unit 136. For example, the output unit 137 generates from predetermined content, suggestion information which is a headline which summarizes content of the predetermined content using the generation model subjected to reinforcement learning by the reinforcement learning unit 136. Subsequently, after the output unit 137 generates the suggestion information, the output unit 137 outputs the generated suggestion information. For example, the output unit 137 generates from predetermined content, suggestion information which is a headline which summarizes content of the predetermined content using the generation model subjected to reinforcement learning by the reinforcement learning unit 136 and outputs the generated headline.

3. Procedure of Information Processing

A procedure of information processing according to the embodiment will be described next using FIG. 4. FIG. 4 is a flowchart illustrating an information processing procedure according to the embodiment. In the example illustrated in FIG. 4, the information processing apparatus 100 acquires a headline of content generated by the generator (step S101). Further, the information processing apparatus 100 generates a headline of content which is the same content as the content corresponding to the headline generated by the generator, using the reference generation model (step S102). Subsequently, the information processing apparatus 100 acquires which of the headline generated by the generator and the headline generated using the reference generation model is favorable through crowdsourcing (step S103).

Subsequently, the information processing apparatus 100 learns the evaluation model on the basis of the information acquired through crowdsourcing (step S104). For example, in a case where both the headline generated by the generator and the headline generated using the reference generation model are input to the evaluation model, the information processing apparatus 100 learns an evaluation learning model so as to output which of the headline generated by the generator and the headline generated using the reference generation model is favorable.

A procedure of information processing according to the embodiment will be described next using FIG. 5. FIG. 5 is a flowchart illustrating an information processing procedure according to the embodiment. In the example illustrated in FIG. 5, the information processing apparatus 100 generates headlines of the same target content respectively using the reference generation model and the generation model (step S201). Subsequently, the information processing apparatus 100 evaluates which of the headline generated using the reference generation model and the headline generated using the generation model is favorable, using the evaluation model (step S202).

Subsequently, the information processing apparatus 100 performs reinforcement learning of the generation model using the evaluation result of the evaluation model as a reward (step S203). For example, the information processing apparatus 100 performs reinforcement learning of the generation model while setting a positive reward in a case where the evaluation value of the generated headline generated using the generation model is higher than the evaluation value of the reference headline generated using the reference generation model (that is, the generated headline is evaluated as more favorable than the reference headline) as a result of evaluation using the evaluation model. Further, the information processing apparatus 100 performs reinforcement learning of the generation model while setting a negative reward in a case where the evaluation value of the reference headline generated using the reference generation model is higher than the evaluation value of the generated headline generated using the generation model (that is, the reference headline is evaluated as more favorable than the generated headline) as a result of evaluation using the evaluation model.

4. Effects

As described above, the information processing apparatus 100 according to the embodiment includes the generation unit 133, the evaluation unit 135 and the reinforcement learning unit 136. The generation unit 133 generates suggestion information from predetermined content using the generation model which generates from content, suggestion information indicating content of the content. The evaluation unit 135 evaluates the suggestion information generated by the generation unit 133 using the evaluation model which has learned which of a plurality of pieces of suggestion information indicating content of the same target content is favorable. The reinforcement learning unit 136 performs reinforcement learning of the generation model on the basis of the evaluation result by the evaluation unit 135.

Thus, the information processing apparatus 100 is able to learn the evaluation model that evaluates good points as a whole sentence in advance, acquire the result through reinforcement learning, and improve quality of the generation model which generates a headline. Therefore, the information processing apparatus 100 is able to learn an appropriate model.

In addition, the generation unit 133 generates suggestion information which is a headline which summarizes content of predetermined content.

This enables the information processing apparatus 100 to improve quality of the generation model which generates a headline which summarizes content of content.

Further, the generation unit 133 generates suggestion information which can transit to predetermined content in a case where the user selects the suggestion information.

This enables the information processing apparatus 100 to improve user-friendliness when a user who shows an interest in the suggestion information browses content corresponding to the suggestion information.

Further, the evaluation unit 135 evaluates the suggestion information generated by the generation unit 133 using the evaluation model which has learned which of the reference suggestion information generated using a reference generation model which becomes a reference for evaluation and human-generated suggestion information generated by the generator is favorable.

This enables the information processing apparatus 100 to generate suggestion information which is as favorable as or more favorable than the suggestion information generated by a human.

In addition, the information processing apparatus 100 further includes the acquisition unit 131 and the evaluation learning unit 134. The acquisition unit 131 acquires an evaluation result indicating which of the human-generated suggestion information and the reference suggestion information is favorable through crowdsourcing. The evaluation learning unit 134 learns an evaluation model on the basis of the evaluation result acquired by the acquisition unit 131. Further, the evaluation learning unit 134 learns the evaluation model so as to evaluate suggestion information which is evaluated as more favorable in the evaluation result acquired by the acquisition unit 131, more highly than suggestion information which is evaluated as less favorable in the evaluation result acquired by the acquisition unit 131.

This enables the information processing apparatus 100 to cause the evaluation model to perform learning while taking into account evaluation by crowd workers. In other words, the information processing apparatus 100 can learn evaluation for good points as a whole sentence such as a headline through evaluation by the crowd workers. The information processing apparatus 100 can learn the evaluation model which evaluates good points as a whole sentence.

Further, the reinforcement learning unit 136 performs reinforcement learning of the generation model while setting a higher reward for a higher evaluation result provided by the evaluation unit 135 for the suggestion information generated by the generation unit 133.

Furthermore, the evaluation unit 135 evaluates which of the reference suggestion information generated using the reference generation model which becomes a reference for evaluation and the suggestion information generated by the generation unit 133 is favorable. The reinforcement learning unit 136 performs reinforcement learning of the generation model while setting a higher reward in a case where the evaluation unit 135 evaluates the suggestion information generated by the generation unit 133 as more favorable than the reference suggestion information.

This enables the information processing apparatus 100 to learn the generation model which generates the suggestion information while taking into account evaluation by the user.

5. Hardware Configuration

Figure 6:
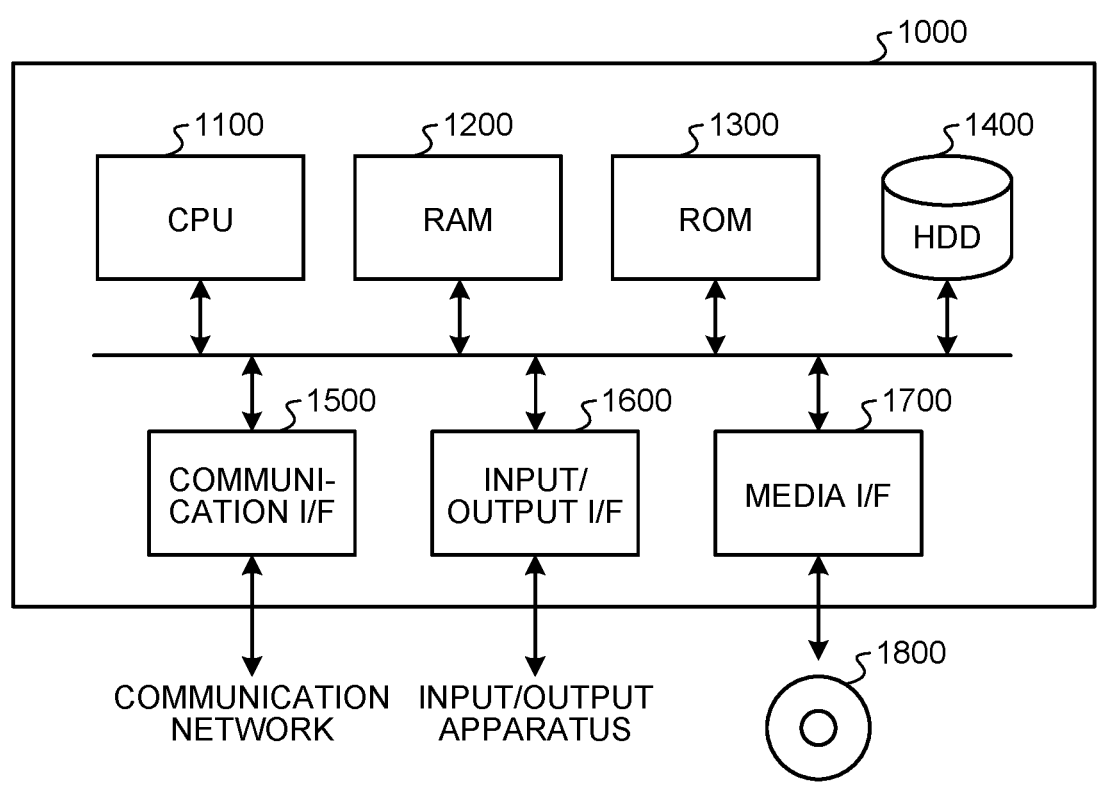
FIG. 6 is a view illustrating an example of a hardware configuration of a computer which executes a program.

Further, the information processing apparatus 100 according to the above-described embodiment is implemented with, for example, a computer 1000 having a configuration as illustrated in FIG. 6. FIG. 6 is a hardware configuration diagram illustrating an example of a computer which implements functions of the information processing apparatus 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400 and controls respective units. The ROM 1300 stores a boot program to be executed by the CPU 1100 upon start-up of the computer 1000, a program dependent on hardware of the computer 1000, and the like.

The HDD 1400 stores a program to be executed by the CPU 1100, data to be used by the program, and the like. The communication interface 1500 receives data from other equipment via a predetermined communication network and transmits the data to the CPU 1100, and transmits data generated by the CPU 1100 to other equipment via a predetermined communication network.

The CPU 1100 controls an output apparatus such as a display and a printer and an input apparatus such as a keyboard and a mouse via the input/output interface 1600. The CPU 1100 acquires data from the input apparatus via the input/output interface 1600. Further, the CPU 1100 outputs generated data to the output apparatus via the input/output interface 1600. Note that a micro processing unit (MPU) or a graphics processing unit (GPU) to meet the necessity of considerable computation power, may be used in place of the CPU 1100.

The media interface 1700 reads a program or data stored in a recording medium 1800 and provides the program or the data to the CPU 1100 via the RAM 1200. The CPU 1100 loads the program on the RAM 1200 from the recording medium 1800 via the media interface 1700 and executes the loaded program. The recording medium 1800 is, for example, an optical recording medium such as a digital versatile disc (DVD) and a phase change rewritable disk (PD), a magnetooptical recording medium such as a magneto-optical disk (MO), a tape medium, a magnetic recording medium or a semiconductor memory.

For example, in a case where the computer 1000 functions as the information processing apparatus 100, the CPU 1100 of the computer 1000 implements functions of the control unit 130 by executing the program loaded on the RAM 1200. While the CPU 1100 of the computer 1000 reads the program from the recording medium 1800 and executes the program, the CPU 1100 may acquire the program from other apparatuses via a predetermined communication network as another example.

While some of the embodiments of the present application have been described in detail above on the basis of the drawings, these are provided for illustrative purposes, and the present invention can be implemented in other forms in which various changes and modifications are made on the basis of knowledge of a person skilled in the art, including the aspects described in disclosure of the invention.

6. Others

Further, all or part of processing described as being automatically performed among the processing described in the above embodiment and modified examples can be manually performed, or all or part of processing described as being manually performed can be automatically performed using a publicly known method. In addition, information including a processing procedure, specific name, various kinds of data and parameters described in the above specification and illustrated in the drawings can be arbitrarily changed unless otherwise described. For example, various kinds of information illustrated in the respective drawings are not limited to the illustrated information.

Further, the illustrated respective components of the respective apparatuses are conceptual functional components, and do not necessarily require to be physically constituted as illustrated. In other words, specific forms of distribution and integration of respective apparatuses are not limited to that illustrated and, all or part of the apparatuses may be functionally or physically distributed or integrated in an arbitrary unit in accordance with various kinds of loads, statuses of use, or the like.

Further, the above-described embodiment and modified example can be combined as appropriate within a range not causing inconsistency in processing content.

Further, "section, module, unit" described above can read "means", "circuit", or the like. For example, the generation unit can read generation means or a generation circuit.

According to one aspect of an embodiment, it is possible to provide an effect of enabling learning of an appropriate model.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor configured to:
acquire base suggestion information generated using a base generation model based on a target content, the base suggestion information indicating content of a target content;
acquire human-generated suggestion information generated by a generator based on the target content, the human-generated suggestion information indicating content of the target content;
acquire a first evaluation result indicating which of the base suggestion information and the human-generated suggestion information is favorable using crowdsourcing;
learn an evaluation model that evaluates which of a plurality of suggestion information indicating content of the target content is favorable based on the first evaluation result;
generate model-generated suggestion information from the target content using a generation model, the model-generated suggestion information indicating content of the target content;
evaluate the model-generated suggestion information to derive a second evaluation result using an evaluation model;
perform reinforcement learning of the generation model on a basis of the second evaluation result,
wherein the processor is configured to derive the second evaluation result by:
inputting the model-generated suggestion information and the base suggestion information generated based on the target content, to the evaluation model; and
outputting an evaluation value indicating favorableness of the model-generated suggestion information and an evaluation value indicating favorableness of the base suggestion information as the second evaluation result of the evaluation model,
wherein the processor is configured to perform reinforcement learning of the generation model by:
setting a positive reward that is proportional to a degree of a difference between the evaluation value indicating favorableness of the model-generated suggestion information and the evaluation value indicating favorableness of the base suggestion information in performing reinforcement learning in a case where the evaluation value of the model-generated suggestion information is higher; and setting a negative reward that is proportional to a degree of a difference between the evaluation value indicating favorableness of the model-generated suggestion information and the evaluation value indicating favorableness of the base suggestion information in performing reinforcement learning in a case where the evaluation value of the base suggestion information is higher, wherein the performing reinforcement learning enables the generation model to generate the model-generated suggestion information which is as favorable as or more favorable than the human-generated suggestion information.

2. The information processing apparatus according to claim 1, wherein the processor is configured to generate the model-generated suggestion information including a headline which summarizes content of the target content.

3. The information processing apparatus according to claim 1, wherein the processor is configured to generate the model-generated suggestion information which transits to the target content in a case where a user selects the suggestion information.

4. The information processing apparatus according to claim 1, wherein the processor is configured to perform reinforcement learning of the generation model while setting a higher reward for the model-generated suggestion information and for which the evaluation result is higher.

5. The information processing apparatus according to claim 1, wherein the processor is further configured to:

evaluate which of the base suggestion information and the model-generated suggestion information is favorable, and perform reinforcement learning of the generation model while setting a higher reward in a case where the model-generated suggestion information is evaluated as more favorable than the base suggestion information.

6. An information processing method to be executed by a computer, the information processing method comprising:

acquiring base suggestion information generated using a base generation model based on a target content, the base suggestion information indicating content of a target content;

acquiring human-generated suggestion information generated by a generator based on a target content, the human-generated suggestion information indicating content of the target content;

acquiring a first evaluation result indicating which of the base suggestion information and the human-generated suggestion information is favorable using crowdsourcing;

learning an evaluation model that evaluates which of a plurality of suggestion information indicating content of the target content is favorable based on the first evaluation result;

generating model-generated suggestion information from the target content using a generation model which generates from content, the model-generated suggestion information indicating content of the target content;

evaluating the model-generated suggestion information to derive a second evaluation result using the evaluation model;

performing reinforcement learning of the generation model on a basis of the evaluation result, wherein the deriving the second evaluation result comprises:

inputting the model-generated suggestion information and the base suggestion information generated based on the target content, to the evaluation model; and outputting an evaluation value indicating favorableness of the model-generated suggestion information and an evaluation value indicating favorableness of the base suggestion information as the second evaluation result of the evaluation model, wherein the performing reinforcement learning of the generation model comprises:

setting a positive reward that is proportional to a degree of a difference between the evaluation value indicating favorableness of the model-generated suggestion information and the evaluation value indicating favorableness of the base suggestion information in performing reinforcement learning in a case where the evaluation value of the model-generated suggestion information is higher; and setting a negative reward that is proportional to a degree of a difference between the evaluation value indicating favorableness of the model-generated suggestion information and the evaluation value indicating favorableness of the base suggestion information in performing reinforcement learning in a case where the evaluation value of the base suggestion information is higher, wherein the performing reinforcement learning enables the generation model to generate the model-generated suggestion information which is as favorable as or more favorable than the human-generated suggestion information.

7. A non-transitory computer-readable storage medium including instructions executable by a processor, wherein the instructions comprise:

an acquisition procedure of acquiring base suggestion information generated using a base generation model based on a target content, the base suggestion information indicating content of a target content;

an acquisition procedure of acquiring human-generated suggestion information generated by a generator based on a target content, the human-generated suggestion information indicating content of the target content;

a first evaluation procedure of acquiring a first evaluation result indicating which of the base suggestion information and the human-generated suggestion information is favorable using crowdsourcing;

a learning procedure of learning an evaluation model that evaluates which of a plurality of suggestion information indicating content of the target content is favorable based on the first evaluation result;

a generation procedure of generating model-generated suggestion information from the target content using a generation model which generates from content, the model-generated suggestion information indicating content of the target content;

a second evaluation procedure of evaluating the model-generated suggestion information to derive second evaluation result using the evaluation model;

a reinforcement learning procedure of performing reinforcement learning of the generation model on a basis of the second evaluation result, wherein the deriving the second evaluation result comprises:

inputting the model-generated suggestion information and the base suggestion information generated based on the target content, to the evaluation model; and outputting an evaluation value indicating favorableness of the model-generated suggestion information and an evaluation value indicating favorableness of the base suggestion information as the second evaluation result of the evaluation model, wherein the performing reinforcement learning of the generation model comprises:

setting a positive reward that is proportional to a degree of a difference between the evaluation value indicating favorableness of the model-generated suggestion information and the evaluation value indicating favorableness of the base suggestion information in performing reinforcement learning in a case where the evaluation value of the model-generated suggestion information is higher; and setting a negative reward that is proportional to a degree of a difference between the evaluation value indicating favorableness of the model-generated suggestion information and the evaluation value indicating favorableness of the base suggestion information in performing reinforcement learning in a case where the evaluation value of the base suggestion information is higher, wherein the performing reinforcement learning enables the generation model to generate the model-generated suggestion information which is as favorable as or more favorable than the human-generated suggestion information.

\* \* \* \* \*